United States Patent [19]

Auyeung

[11] Patent Number: 5,790,706

[45] Date of Patent: Aug. 4, 1998

[54] METHOD AND APPARATUS FOR SCANNING OF TRANSFORM COEFFICIENTS

[75] Inventor: Cheung Auyeung, Hoffman Estates, Ill.

[73] Assignee: Motorola, Inc., Schaumburg, Ill.

[21] Appl. No.: 675,516

[22] Filed: Jul. 3, 1996

[51] Int. Cl.$^6$ .............................. G06K 9/36; G06K 9/46; H04N 7/12

[52] U.S. Cl. ..................... 382/248; 382/250; 348/403; 348/408

[58] Field of Search ..................... 382/248, 250, 382/232, 233; 348/395, 403–408; 358/432–433; 364/715.02

[56] References Cited

U.S. PATENT DOCUMENTS

| | | | |
|---|---|---|---|
| 4,751,742 | 6/1988 | Meeker | 382/248 |
| 5,155,592 | 10/1992 | Verbiest | 348/403 |
| 5,276,525 | 1/1994 | Gharavi | 358/261.1 |
| 5,473,376 | 12/1995 | Auyeung | 348/403 |
| 5,561,464 | 10/1996 | Park | 348/398 |

*Primary Examiner*—Leo Boudreau
*Assistant Examiner*—Bhavesh Mehta
*Attorney, Agent, or Firm*—Darleen J. Stockley

[57] ABSTRACT

The present invention provides an apparatus and method for, in at least one of: encoding and decoding, scanning transform coefficients in an image/video encoded/decoder. In encoding, the steps include: A) segregating a predetermined number of quantized transform coefficients into a plurality of coefficient zones and storing the coefficient zones in a memory unit; B) examining each coefficient to determine which zone/zones has/have at least one non-zero coefficient; C) scanning each coefficient of the zones having at least one non-zero coefficient in a predetermined scanning order; D) encoding which coefficient zone contains at least one non-zero coefficient to provide first entropy-encoded information bits; E) determining whether at least one coefficient zone is to be encoded; F) encoding the non-zero coefficients to provide second entropy encoded information bits. Decoding is accomplished in mirror fashion.

8 Claims, 5 Drawing Sheets

METHOD AND APPARATUS FOR SCANNING OF TRANSFORM COEFFICIENTS

FIELD OF THE INVENTION

The present invention relates to video/image compression and, more particularly, to coding of transform coefficients.

BACKGROUND OF THE INVENTION

Video systems are known to include a plurality of communication devices and communication channels, which provide the communication medium for the communication devices. For example, the communication channel may be wire line connections or radio frequency, RF, carriers. To increase the efficiency of the video system, video that needs to be communicated over the communication medium is digitally compressed. Digital compression reduces the number of bits needed to represent the video while maintaining perceptual quality of the video. The reduction in bits allows more efficient use of channel bandwidth and reduces storage requirements. To achieve digital video compression, each communication device may include an encoder and a decoder. The encoder allows a communication device to compress video before transmission over a communication channel. The decoder enables the communication device to receive compressed video from a communication channel and render it visible. Communication devices that may use digital video compression include television transmitters and receivers, cable television transmitters and receivers, video telephones, computers and portable radios.

Several emerging standards for digital video compression are being developed, including International Telecommunications Union (ITU), ITU-T Recommendation H.263+and H.263/L, the International Standards Organization/International Electrotechnical Committee (ISO/IEC), and International Standard MPEG-4. These standards are likely to use transform coding as part of the building blocks for good coding efficiency. Currently, the Expert's Group on Very Low Bitrate Visual Telephony, LBC, is considering using the discrete cosine transform for coding efficiency. The Moving Pictures Expert's Group, MPEG, is also likely to use the discrete cosine transform or other type of transform. To achieve compression, the transform coefficients are quantized, scanned, and entropy coded. Therefore, to maximize the compression capability, a need exists for a method and apparatus for scanning the quantized transform coefficients so that they can be more efficiently entropy encoded than the emerged standard H.261, H.263, MPEG-1, and MPEG-2.

DETAILED DESCRIPTION OF A PREFERRED EMBODIMENT

The present invention is a method and an apparatus for scanning the transform coefficients in a video/image compression system. For scanning, first, a predetermined number of quantized transform coefficients are received. Second, the quantized transform coefficients are separated into a predetermined number of disjoint coefficient zones whose coefficients are more statistically dependent within a zone than across zones. Third, the coefficients in each zone are scanned in a predetermined order giving a generally decreasing average power. Then a first entropy encoder encodes which coefficient zone has at least one non-zero coefficient to provide entropy encoded information bits. For each coefficient zone with non-zero coefficients, its coefficients are encoded by an entropy encoder selected from a plurality of entropy encoder selected by a predetermined scheme to provide entropy encoded information bits. The information bits from the first entropy encoder and the entropy encoders are multiplexed together in a predetermined order to form the final entropy encoded information bits.

This invention may be used with a compression algorithm that processes a picture into two-dimensional blocks of quantized transform coefficients with predetermined transform sizes. Each block is then divided into a plurality of zones. The coefficients in each zone are scanned into a one-dimensional array in a predetermined order giving generally decreasing average power.

The two dimensional array of quantized transform coefficients are scanned into a plurality of one-dimensional array of coefficients zones as shown by the following example. For example, consider the two dimensional array of 8×8 quantized coefficients

Figure 5:
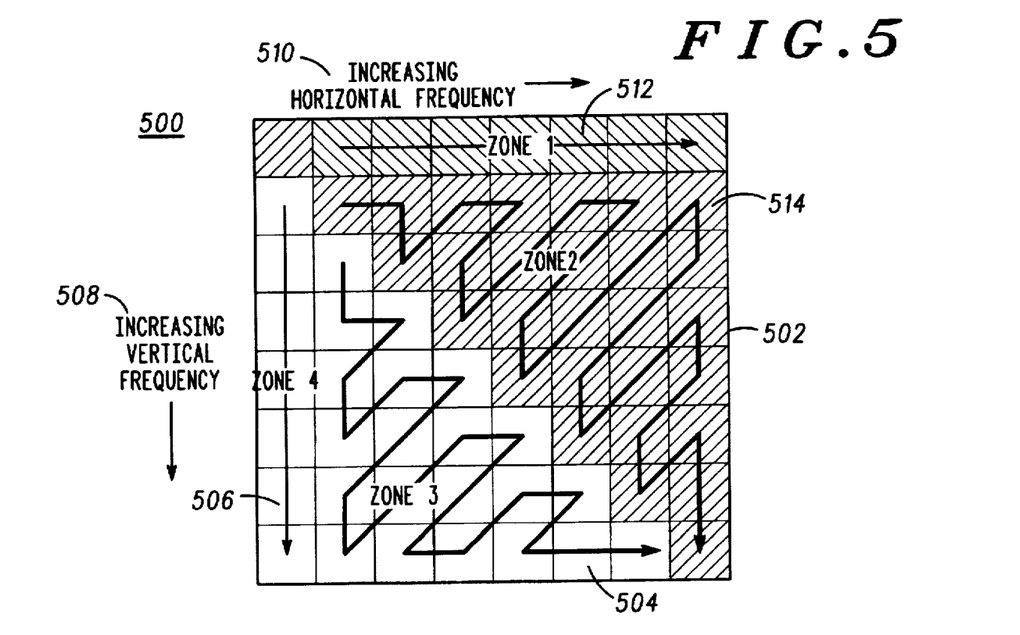
FIG. 5 is a graphic representation of scanning order in accordance with the present invention.

| 4 | 2 | 1 | 1 | 1 | 0 | 0 | 0 |
|---|---|---|---|---|---|---|---|
| 1 | 3 | 3 | 1 | 1 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 | which are scanned by the scanning order in FIG. 5 into the DC coefficient, {4}, and four one-dimensional arrays, zone-1 = {2,1,1,1,0,0,0}
zone-2 = {3,3,0,1,1,0,0,0,0,0,0,0,0,0,0,0,0,0,0,0,0,0}
zone-3 = {0,0,0,0,0,0,0,0,0,0,0,0,0,0,0,0,0,0,0,0}
zone-4 = {1,1,0,0,0,0,0,}.

A variable length code is sent to indicate that zone-1, zone-2, zone-4 contain non-zero coefficients, and zone-3 consists entirely of zero coefficients. Then the coefficients in zone-1, zone-2, and zone-4 are entropy encoded separately. An example of the entropy encoders is the entropy encoders used in H.263 for coding transform coefficients.

Figure 1:
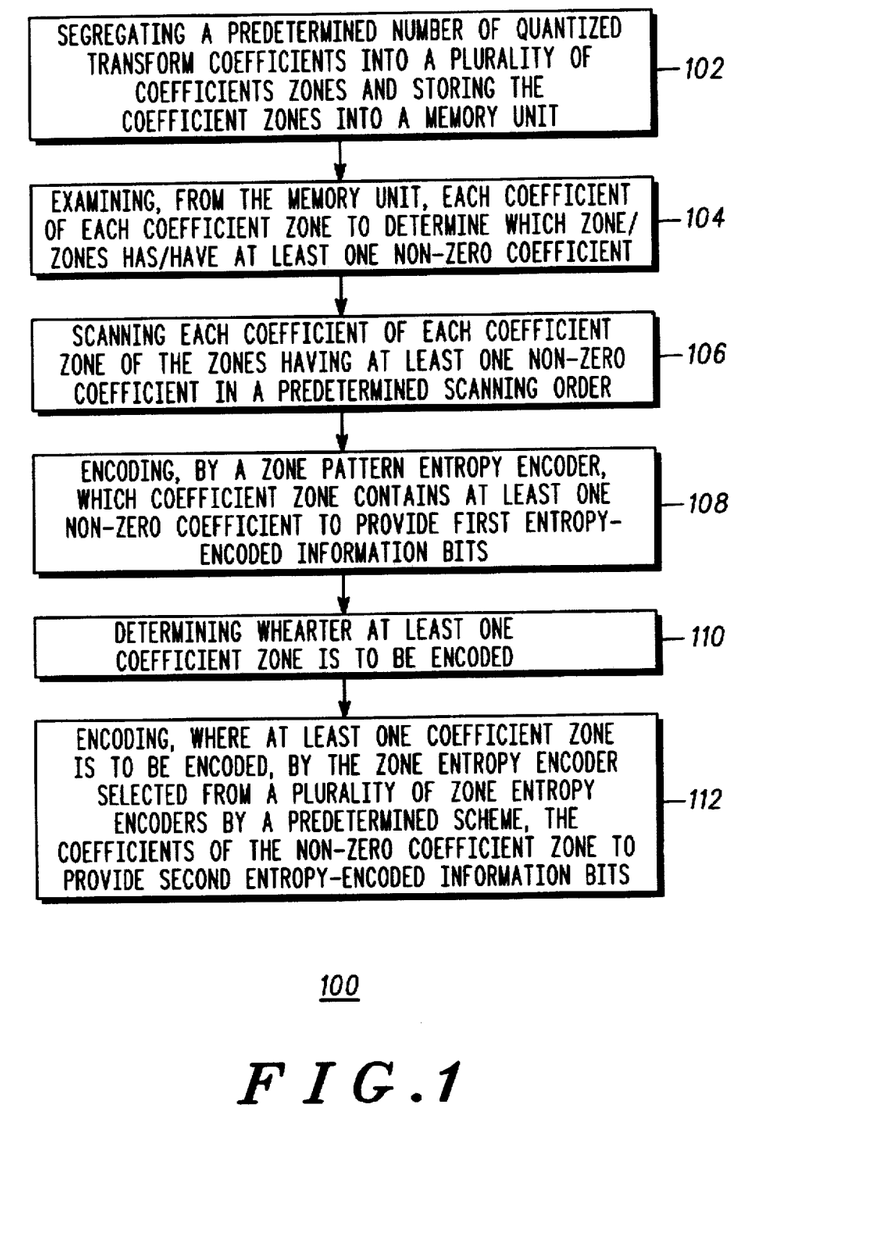
FIG. 1 is a flowchart showing one embodiment of steps of a method of encoding in accordance with the present invention.

The present invention can be more fully described with reference to FIGS. 1–5. FIG. 1, numeral 100, is a flowchart showing one embodiment of steps of a method of encoding in accordance with the present invention. The first step in the encoding method is segregating a predetermined number of quantized transform coefficients into a plurality of coefficient zones and storing the coefficient zones in a memory unit (102) in a manor that the coefficients within one zone are more statistically dependent than the coefficients across zones. The second step in the encoding method is examining, from the memory unit, each coefficient of each coefficient zone to determine which zone/zones has/have at least one non-zero coefficient (104). The third step in the encoding method is scanning each coefficient of each coefficient zone of the zones having at least one non-zero coefficient in a predetermined scanning order (106) giving, in general, decreasing average power. The fourth step in the encoding method is encoding, by a zone pattern entropy encoder, which coefficient zone contains at least one non-zero coefficient to provide first entropy-encoded information bits (108). The fifth step in the encoding method is determining whether at least one coefficient zone is to be encoded (110). If the coefficients are generated from a still picture or any of the coefficient is not zero, then at least one coefficient zone is to be encoded. Otherwise, none of the coefficient zone is to be encoded. The sixth and final step in the encoding method is encoding, where at least one coefficient zone is to be encoded, by the zone entropy encoder selected a priori from a plurality of zone entropy encoders based on a priori statistic of the coefficients in the coefficient zone being encoded, the coefficients of the non-zero coefficient zone to provide second entropy encoded information bits (112).

Figure 2:
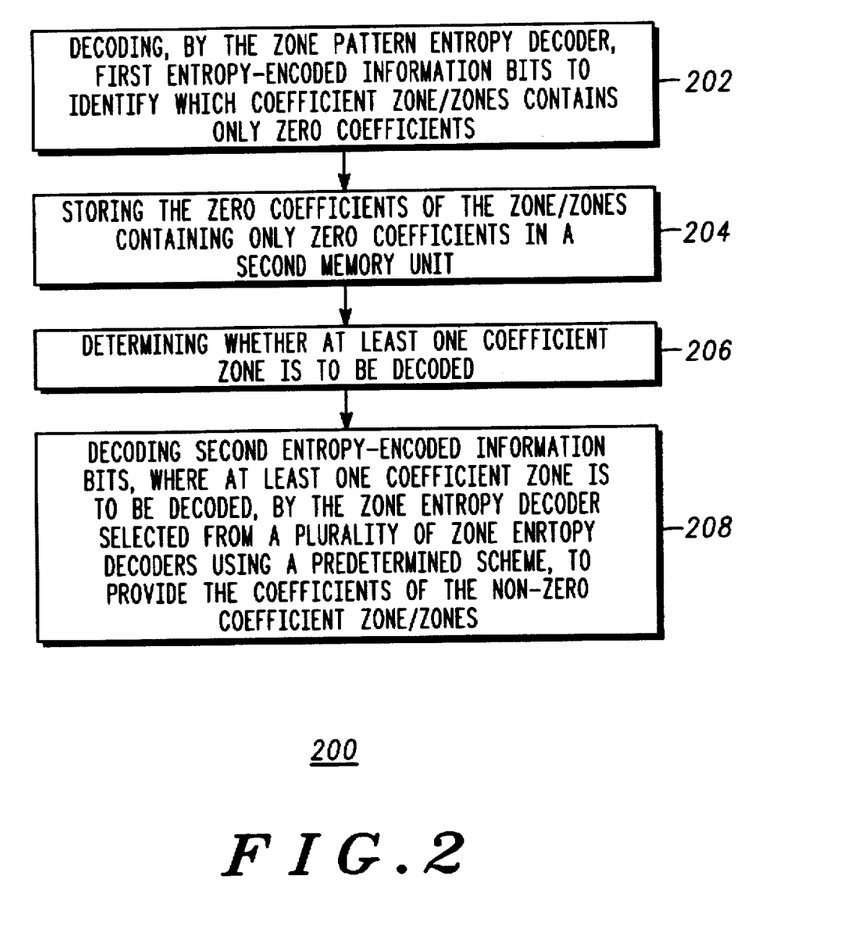
FIG. 2 is a flowchart showing one embodiment of steps of a method of decoding in accordance with the present invention.

FIG. 2, numeral 200, is a flowchart showing one embodiment of steps of a method of decoding in accordance with the present invention. The first step in the decoding method is decoding, by the zone pattern entropy decoder, the entropy-encoded information bits to identify which coefficient zone/zones contains only zero coefficients (202). The second step in the decoding method is storing the zero coefficients of the zone/zones containing only zero coefficients in a second memory unit (204). The third step in the decoding method is determining whether at least one coefficient zone is to be decoded (206). If the coefficients are generated from a still picture or the zone pattern indicates that at least one zone contains non-zero coefficient, then at least one coefficient zone is to be decoded. Otherwise, none of the coefficient zone is to be decoded. The forth and final step in the decoding method is decoding second entropy encoded information bits, where at least one coefficient zone is to be decoded, by the zone entropy decoder selected a priori from a plurality of zone entropy decoders to provide the coefficients of the non-zero coefficient zone/zones (208).

Figure 3:
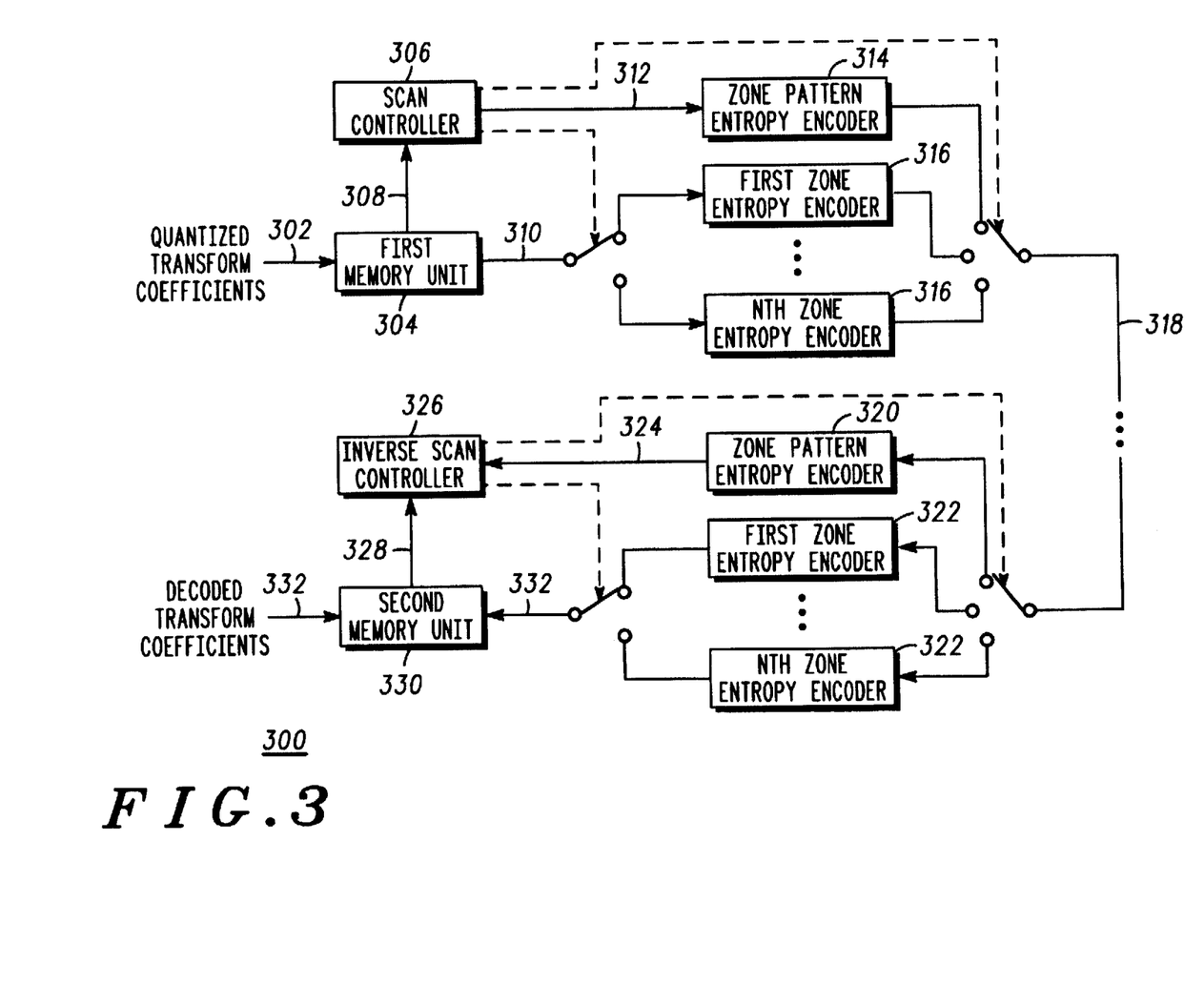
FIG. 3 is a block diagram of one embodiment of a device in accordance with the present invention.

FIG. 3, numeral 300, is a block diagram of one embodiment of a device in accordance with the present invention. The device comprises a first memory unit (304), a scan controller (306), a zone pattern entropy encoder (314), and a plurality of zone entropy encoders (316). When decoding is performed, the device further comprises a zone pattern entropy decoder (320), a inverse scan controller (326), a plurality of zone entropy decoders (322) and a second memory unit (330).

For encoding, the quantized transform coefficients (302) are received and stored in the first memory unit (304). The scan controller (306), coupled to receive quantized transform coefficients (308) from the memory unit, for segregating a predetermined number of quantized transform coefficients into a plurality of coefficient zones, scanning each coefficient of each coefficient zone in a predetermined scanning order of generally decreasing average power to determine zones having at least one non-zero coefficient and determining whether at least one coefficient zone is to be encoded. The zone pattern entropy encoder (314), coupled to the scan controller (306), for encoding the zone pattern (312) to provide first entropy-encoded information bits designating which coefficient zone contains at least one non-zero coefficient. The zone entropy encoder/encoders (316), coupled to the scan controller (306) and a priori selectably coupled to receive quantized transform coefficients (310) from the first memory unit, for encoding, where at least one coefficient zone is to be encoded, the coefficients of the non-zero coefficient zone/zones to provide second entropy encoded information bits.

For decoding, the zone pattern entropy decoder (302), coupled to receive entropy encoded information bits (318), for decoding the entropy-encoded information bits to identify which coefficient zone/zones contains/contain only zero coefficients. The inverse scan controller (326), coupled to the zone pattern entropy encoder (320), regenerates the zero coefficients of the zone/zones containing only zero coefficients and stores the regenerated zero coefficients (328) in the second memory unit (330), and decides a priori which coefficient zone is to be decoded by which entropy decoder of the plurality of zone entropy decoders (322). The zone entropy decoder/decoders (322), coupled to the inverse scan controller (326) and selectably coupled to receive the second entropy encoded information bits. The zone entropy decoder/decoders decode the second entropy encoded information bits to provide the coefficients of the non-zero coefficient zone/zones (332).

Figure 4:
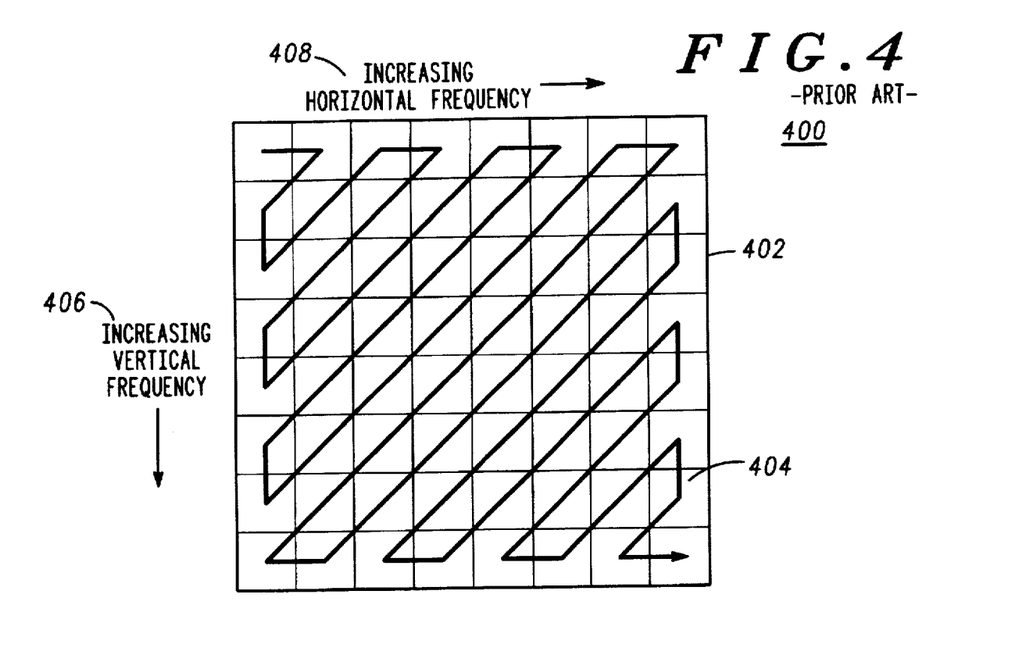
FIG. 4 is a graphic representation of scanning order as is known in the H.261, H.263, MPEG-1, and MPEG-2.

FIG. 4, numeral 400, is a graphic representation of scanning order of quantized 8×8 DCT coefficient as is known in the H.261, H.263, MPEG-1. The 8×8 DCT coefficients is illustrated by the two dimensional grid (402) in increasing horizontal frequency (408) from left to right and in increasing vertical frequency (406) from top to bottom. The quantized transform coefficients are scanned in a zig-zag order (404) to form a one-dimensional array of 64 coefficients generally in the order of decreasing average power.

FIG. 5, numeral 500, is a graphic representation of scanning order of 8×8 quantized intra DCT coefficients in accordance with the present invention. The 8×8 intra DCT coefficients is illustrated by the two dimensional grid (502) in increasing horizontal frequency (410) from left to right and in increasing vertical frequency (508) from top to bottom. The quantized transform coefficients are scanned into DC and four disjoint AC zones (512,514, 504, 506) to form four one-dimensional arrays of AC coefficients.

Figure 6:
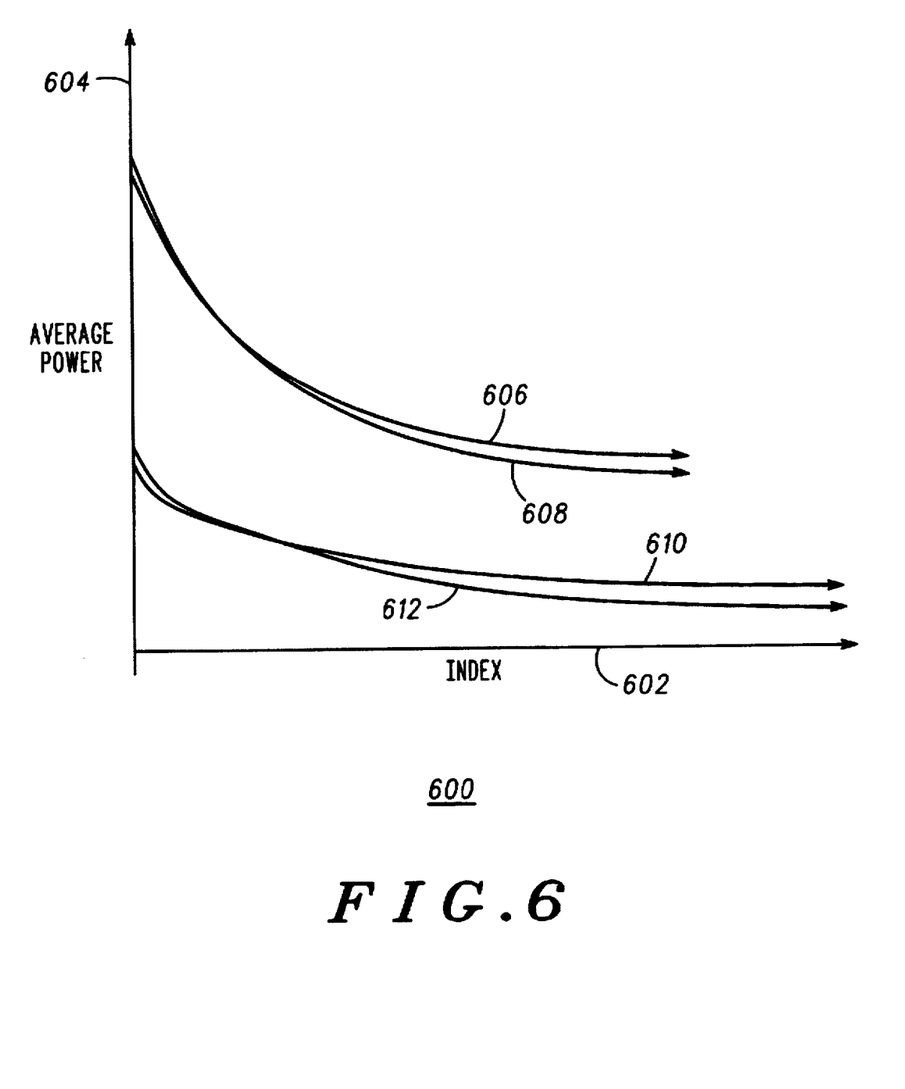
FIG. 6 is a graphic representation of the average power of the scanned coefficients in each zone in accordance with the present invention.

FIG. 6, numeral 600, is a graphic representation of the average power (604) of the coefficients of each zone in the scanning order (602) in accordance with the present invention where the graph of the average power of zone-1 (606) and zone-4 (608) are similar and distinctly higher than the graph of the average power of zone-2 (610) and zone-3 (612), where the average power of zone-2 and zone-3 are also.

The present invention codes the quantized transform coefficients with less number of bits than the coding method used in H.261, H.263, MPEG-1, and MPEG2. The present encodes the coefficients in each zone having similar statistics by a entropy encoder optimized for the local statistics of the coefficients in a zone while the single entropy encoder in each of H.261, H.263, MPEG-1, and MPEG-2, cannot be optimized for the local statistics of the coefficients.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for, in at least one of: encoding and decoding, scanning transform coefficients in an image/video encoded/decoder, comprising the steps of:

in encoding:
- A) segregating a predetermined number of quantized transform coefficients into a plurality of coefficient zones and storing the coefficient zones in a memory unit;
- B) examining, from the memory unit, each coefficient of each coefficient zone to determine which zone/zones has/have at least one non-zero coefficient;
- C) scanning each coefficient of each coefficient zone of the zones having at least one non-zero coefficient in a predetermined scanning order;
- D) encoding, by a zone pattern entropy encoder, which coefficient zone contains at least one non-zero coefficient to provide first entropy-encoded information bits;
- E) determining whether at least one coefficient zone is to be encoded;
- F) encoding, where at least one coefficient zone is to be encoded, by the zone entropy encoder selected from a plurality of zone entropy encoders by a predetermined scheme, the coefficients of the non-zero coefficient zone to provide second entropy encoded information bits;

and in decoding:
- G) decoding, by the zone pattern entropy decoder, the entropy-encoded information bits to identify which coefficient zone/zones contains only zero coefficients;
- H) storing the zero coefficients of the zone/zones containing only zero coefficients in a second memory unit;
- I) determining whether at least one coefficient zone is to be decoded;
- J) decoding second entropy encoded information bits, where at least one coefficient zone is to be decoded, by the zone entropy decoder selected from a plurality of zone entropy decoders using a predetermined scheme, to provide the coefficients of the non-zero coefficient zone/zones.

2. The method of claim 1 wherein the method is embodied in:
- A) an integrated circuit;
- B) a processor;
- C) software;
- D) a computer;
- E) a television set.

3. Digital storage media having a method stored on said digital storage media, for, in at least one of: encoding and decoding, scanning transform coefficients in an image/video encoded/decoder, comprising the steps of:

in encoding:
- A) segregating a predetermined number of quantized transform coefficients into a plurality of coefficient zones and storing the coefficient zones in the digital storage media;
- B) examining, from the digital storage media, each coefficient of each coefficient zone to determine which zone/zones has/have at least one non-zero coefficient;
- C) scanning each coefficient of each coefficient zone of the zones having at least one non-zero coefficient in a predetermined scanning order;
- D) encoding, by a zone pattern entropy encoder, which coefficient zone contains at least one non-zero coefficient to provide first entropy-encoded information bits;
- E) determining whether at least one coefficient zone is to be encoded;
- F) encoding, where at least one coefficient zone is to be encoded, by the zone entropy encoder selected from a plurality of zone entropy encoders by a predetermined scheme, the coefficients of the non-zero coefficient zone to provide second entropy encoded information bits;

and in decoding:
- G) decoding, by the zone pattern entropy decoder, the entropy-encoded information bits to identify which coefficient zone/zones contains only zero coefficients;
- H) storing the zero coefficients of the zone/zones containing only zero coefficients in the digital storage media;
- I) determining whether at least one coefficient zone is to be decoded;
- J) decoding second entropy encoded information bits, where at least one coefficient zone is to be decoded, by the zone entropy decoder selected from a plurality of zone entropy decoders using a predetermined scheme, to provide the coefficients of the non-zero coefficient zone/zones.

4. A apparatus for, in at least one of: encoding and decoding, scanning quantized transform coefficients in an image/video encoded/decoder, comprising:

in an encoder:
- A) a memory unit, for receiving and storing the quantized transform coefficients;
- B) a scan controller, coupled to receive quantized transform coefficients from the memory unit, for segregating a predetermined number of quantized transform coefficients into a plurality of coefficient zones, scanning each coefficient of each coefficient zone in a predetermined scanning order to determine zones having at least one non-zero coefficient and determining whether at least one coefficient zone is to be encoded;
- D) a zone pattern entropy encoder, coupled to the scan controller, for encoding to provide first entropy-encoded information bits designating which coefficient zone contains at least one non-zero coefficient;
- E) zone entropy encoder/encoders, coupled to the scan controller and selectably coupled to receive quantized transform coefficients from the first memory unit, for encoding, where at least one coefficient zone is to be encoded, in accordance with a predetermined scheme, the coefficients of the non-zero coefficient zone/zones to provide second entropy encoded information bits;

and in decoding:
- G) a zone pattern entropy decoder, coupled to receive entropy encoded information bits, for decoding the entropy-encoded information bits to identify which coefficient zone/zones contains/contain only zero coefficients;
- H) an inverse scan controller, coupled to the zone pattern entropy encoder, for regenerating the zero coefficients of the zone/zones containing only zero coefficients and storing regenerated zero coefficients in a second memory unit, determining which coefficient zone is to be decoded;

I) zone entropy decoder/decoders, coupled to the inverse scan controller and selectably coupled to receive the second entropy encoded information bits, for decoding the second entropy encoded information bits, to provide the coefficients of the non-zero coefficient zone/zones.

5. The apparatus of claim 1 wherein the apparatus is in:
A) an integrated circuit;
B) a processor;
C) software;
D) a computer;
E) a television set.

6. A computer having an apparatus for, in at least one of: encoding and decoding, scanning quantized transform coefficients in an image/video encoded/decoder, comprising:

in an encoder:
  A) a memory unit, for receiving and storing the quantized transform coefficients;
  B) a scan controller, coupled to receive quantized transform coefficients from the memory unit, for segregating a predetermined number of quantized transform coefficients into a plurality of coefficient zones, scanning each coefficient of each coefficient zone in a predetermined scanning order to determine zones having at least one non-zero coefficient and determining whether at least one coefficient zone is to be encoded;
  D) a zone pattern entropy encoder, coupled to the scan controller, for encoding to provide first entropy-encoded information bits designating which coefficient zone contains at least one non-zero coefficient;
  E) zone entropy encoder/encoders, coupled to the scan controller and selectably coupled to receive quantized transform coefficients from the first memory unit, for encoding, where at least one coefficient zone is to be encoded, in accordance with a predetermined scheme, the coefficients of the non-zero coefficient zone/zones to provide second entropy encoded information bits;

and
in decoding:
  G) a zone pattern entropy decoder, coupled to receive entropy encoded information bits, for decoding the entropy-encoded information bits to identify which coefficient zone/zones contains/contain only zero coefficients;
  H) an inverse scan controller, coupled to the zone pattern entropy encoder, for regenerating the zero coefficients of the zone/zones containing only zero coefficients and storing regenerated zero coefficients in a second memory unit, determining which coefficient zone is to be decoded;
  I) zone entropy decoder/decoders, coupled to the inverse scan controller and selectably coupled to receive the second entropy encoded information bits, for decoding the second entropy encoded information bits, to provide the coefficients of the non-zero coefficient zone/zones.

7. An integrated circuit having an apparatus for, in at least one of: encoding and decoding, scanning quantized transform coefficients in an image/video encoded/decoder, comprising:

in an encoder:
  A) a memory unit, for receiving and storing the quantized transform coefficients;
  B) a scan controller, coupled to receive quantized transform coefficients from the memory unit, for segregating a predetermined number of quantized transform coefficients into a plurality of coefficient zones, scanning each coefficient of each coefficient zone in a predetermined scanning order to determine zones having at least one non-zero coefficient and determining whether at least one coefficient zone is to be encoded;
  D) a zone pattern entropy encoder, coupled to the scan controller, for encoding to provide first entropy-encoded information bits designating which coefficient zone contains at least one non-zero coefficient;
  E) zone entropy encoder/encoders, coupled to the scan controller and selectably coupled to receive quantized transform coefficients from the first memory unit, for encoding, where at least one coefficient zone is to be encoded, in accordance with a predetermined scheme, the coefficients of the non-zero coefficient zone/zones to provide second entropy encoded information bits;

and
in decoding:
  G) a zone pattern entropy decoder, coupled to receive entropy encoded information bits, for decoding the entropy-encoded information bits to identify which coefficient zone/zones contains/contain only zero coefficients;
  H) an inverse scan controller, coupled to the zone pattern entropy encoder, for regenerating the zero coefficients of the zone/zones containing only zero coefficients and storing regenerated zero coefficients in a second memory unit, determining which coefficient zone is to be decoded;
  I) zone entropy decoder/decoders, coupled to the inverse scan controller and selectably coupled to receive the second entropy encoded information bits, for decoding the second entropy encoded information bits, to provide the coefficients of the non-zero coefficient zone/zones.

8. A television set having an apparatus for, in at least one of: encoding and decoding, scanning quantized transform coefficients in an image/video encoded/decoder, comprising:

in an encoder:
  A) a memory unit, for receiving and storing the quantized transform coefficients;
  B) a scan controller, coupled to receive quantized transform coefficients from the memory unit, for segregating a predetermined number of quantized transform coefficients into a plurality of coefficient zones, scanning each coefficient of each coefficient zone in a predetermined scanning order to determine zones having at least one non-zero coefficient and determining whether at least one coefficient zone is to be encoded;
  D) a zone pattern entropy encoder, coupled to the scan controller, for encoding to provide first entropy-encoded information bits designating which coefficient zone contains at least one non-zero coefficient;
  E) zone entropy encoder/encoders, coupled to the scan controller and selectably coupled to receive quantized transform coefficients from the first memory unit, for encoding, where at least one coefficient zone is to be encoded, in accordance with a predetermined scheme, the coefficients of the non-zero coefficient zone/zones to provide second entropy encoded information bits;

and in decoding:

G) a zone pattern entropy decoder, coupled to receive entropy encoded information bits, for decoding the entropy-encoded information bits to identify which coefficient zone/zones contains/contain only zero coefficients;

H) an inverse scan controller, coupled to the zone pattern entropy encoder, for regenerating the zero coefficients of the zone/zones containing only zero coefficients and storing regenerated zero coefficients in a second memory unit, determining which coefficient zone is to be decoded;

I) zone entropy decoder/decoders, coupled to the inverse scan controller and selectably coupled to receive the second entropy encoded information bits, for decoding the second entropy encoded information bits, to provide the coefficients of the non-zero coefficient zone/zones.

* * * * *